(12) United States Patent
Jiang

(10) Patent No.: US 8,008,624 B2
(45) Date of Patent: Aug. 30, 2011

(54) X-RAY DETECTOR FABRICATION METHODS AND APPARATUS THEREFROM

(75) Inventor: Haochuan Jiang, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 1112 days.

(21) Appl. No.: 11/623,723

(22) Filed: Jan. 16, 2007

(65) Prior Publication Data

US 2008/0170656 A1     Jul. 17, 2008

(51) Int. Cl.
*G01T 1/10*     (2006.01)
*G01T 1/20*     (2006.01)
(52) U.S. Cl. ................. 250/361 R; 250/370.11
(58) Field of Classification Search ............ 250/370.11, 250/370.12, 370.09, 361 R
See application file for complete search history.

(56) References Cited

U.S. PATENT DOCUMENTS

| | | |
|---|---|---|
| 3,974,389 A | 8/1976 | Ferri et al. |
| 4,405,691 A | 9/1983 | Yale |
| 4,421,671 A | 12/1983 | Cusano et al. |
| 4,473,513 A | 9/1984 | Cusano et al. |
| 4,507,560 A | 3/1985 | Mathers et al. |
| 4,525,628 A | 6/1985 | DiBianca et al. |
| 4,783,596 A | 11/1988 | Riedner et al. |
| 4,807,241 A | 2/1989 | Berkstresser et al. |
| 5,057,692 A | 10/1991 | Greskovich et al. |
| 5,096,614 A | 3/1992 | Yale et al. |
| 6,143,200 A | 11/2000 | Akiwa et al. |
| 7,008,558 B2 | 3/2006 | Vartuli et al. |
| 2004/0067355 A1* | 4/2004 | Yadav et al. ............. 428/323 |
| 2005/0211916 A1* | 9/2005 | Matsumoto et al. ....... 250/484.4 |
| 2005/0274895 A1* | 12/2005 | Jiang et al. ............. 250/370.11 |

OTHER PUBLICATIONS

Sol-Gel Preparation and Characterization of Codoped Yttrium Aluminum Garnet Powders. Leleckaite, Asta; Kareiva, Aivaras; Bettentrup, Helga; Juestel, Thomas; Meyer, H.-Juergen ChemInform, vol. 37, Issue 7, 2006, Published Online: Nov. 21, 2005.*
Rare-Earth Actived Sol-Gel Films for Scintillator Applications; A. Garcia-Murillo, C. LeLuyer-Urlacher, C. Dujardin, C. Pédrini and J. Mugnier; Journal of Sol-Gel Science and Technology; Publisher, Springer Netherlands ISSN 0928-0707 (Print) 1573-4846 (Online) Issue vol. 26, Nos. 1-3 / Jan. 2003 pp. 957-960.*
C. Mansuy, R. Mahiou, and J. M. Nedelec, "A new sol-gel route to Lu2SiO5 (LSO) scintillator: powders and thin films," Chemistry of Materials, vol. 15, No. 17, pp. 3242-3244, 2003.*

* cited by examiner

*Primary Examiner* — Michael G Lee
*Assistant Examiner* — Jessica L Eley
(74) *Attorney, Agent, or Firm* — ZPS Group, SC

(57) ABSTRACT

A method includes fabricating an energy detector using a sol-gel process.

15 Claims, 6 Drawing Sheets

150   Figure 4   152

X-RAY DETECTOR FABRICATION METHODS AND APPARATUS THEREFROM

BACKGROUND OF THE INVENTION

This invention relates generally to imaging methods and apparatus, and more particularly, to methods and apparatus that provide for improvements in x-ray detector fabrication.

X-ray detectors typically include a photodiode portion and a scintillator portion. An x-ray enters the detector and impinges the scintillator material, wherein photons of visible light are created. The visible light then leaves the scintillator material and impinges a photodiode. The photodiodes are polled, returning attenuation measurements. This data is then used to create images.

Currently most of the scintillator ceramics are made from wet chemical processes. The wet chemical processes include dissolving all the ingredients in acid to make a homogeneous solution and the coprecipitation to convert the solution into a slurry. For instance, some scintillator ceramics are made with the oxalate coprecipitation processes. First $Y_2O_3$, $Gd_2O_3$, $Eu_2O_3$, and other dopants are dissolved in nitric acid to prepare a nitrate solution. The nitrate solution is mixed with an oxalic acid solution through dual flow and mixing. During the mixing, the nitrate reacts with the oxalic acid to form insoluble oxalate (a mixture of yttrium oxalate, gadollium oxalate, europium oxalate, and the oxalate of other dopants). Then the oxalate is filtered and washed with DI water (deionized). The wet cake is dried after filtration. The dried powder is then milled and calcined to form an oxide powder. The oxide powder is dry compacted and sintered into a transparent ceramic. The process for Lu—Tb—Al—O based garnet scintillator is very similar. A sulfate or nitrate solution is first prepared, then the solution is mixed with ammonium hydroxide solution to form the Lu—Tb—Al hydroxide gel as a slurry. The slurry is filtered, washed, dried, milled, and calcined sequentially afterwards.

One problem of this process is the agglomeration of powder and the complexity of the processes. Therefore, it is desirable to have a nanometer sized powder process for the ceramic scintillators to achieve a relatively high transparent scintillator material with a relatively lower sintering temperature and to reduce defects and manufacturing cost.

BRIEF DESCRIPTION OF THE INVENTION

In one aspect, a method includes fabricating an energy detector using a sol-gel process.

In another aspect, a detector includes a nanometer sized powder sintered with a grain size of less than 10μ.

In yet another aspect, a CT system includes a x-ray source configured to emit x-rays, a x-ray detector positioned to receive x-rays emitted by the source, and a computer operationally coupled to the source and detector, the detector comprising a nanometer sized powder sintered with a grain size of less than 10μ.

DETAILED DESCRIPTION OF THE INVENTION

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all diagnostic imaging systems, all current modalities and/or any modality yet to be developed in which scintillators and reflectors are used.

Figure 1:
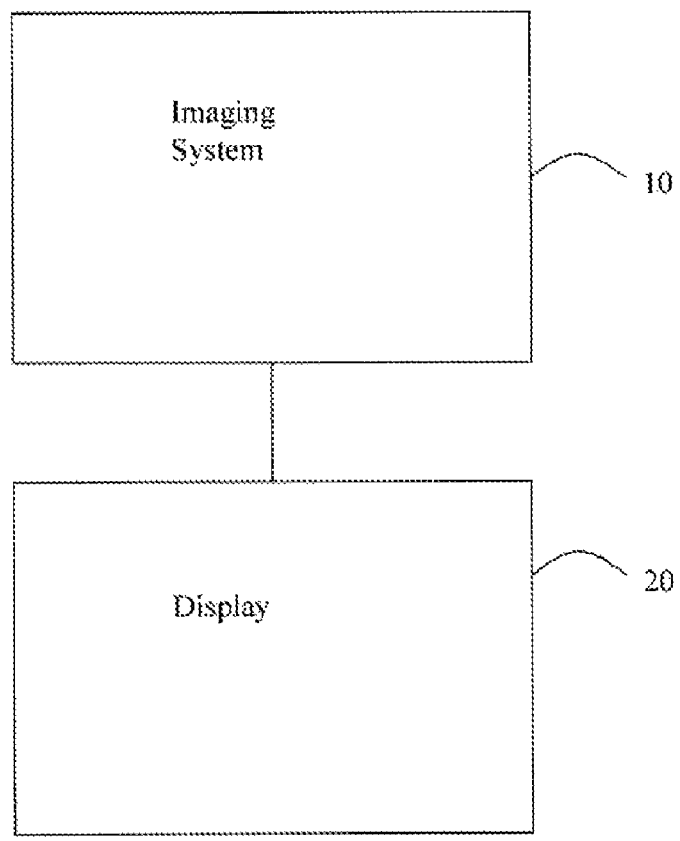
FIG. 1 illustrates an exemplary diagnostic imaging system.

FIG. 1 illustrates an imaging system 10 with an associated display 20. Imaging system 10 can be of any modality, but in one embodiment, system 10 is a CT system. In another embodiment, system 10 is a dual modality imaging system such as a combined CT/PET system and data can be acquired in one modality (e.g., CT) and the processed data can be transferred to the other modality (e.g., PET). Display 20 can be separate from system 10 or integrated with system 10. System 10 includes an acquisition device such as an x-ray radiation detector. It is contemplated that the benefits of the invention accrue to human and non-human imaging systems such as those systems typically employed in small animal research. Also, it is contemplated that the benefits of the invention accrue to non-medical imaging systems such as those systems typically employed in an industrial setting or a transportation setting, such as, for example, but not limited to, a baggage scanning CT system for an airport or other transportation center as shown in FIG. 2.

Figure 2:
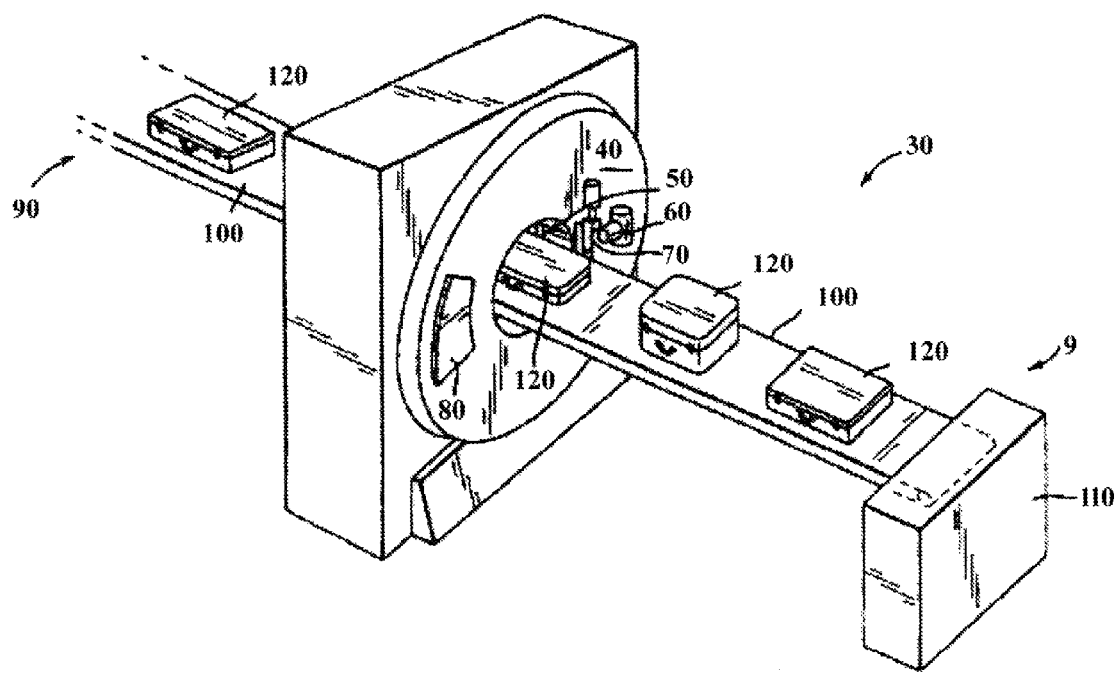
FIG. 2 illustrates a package/baggage inspection system.

Referring now to FIG. 2, a package/baggage inspection system 30 includes a rotatable gantry 40 having an opening 50 therein through which packages or pieces of baggage may pass. The rotatable gantry 50 houses a high frequency electromagnetic energy source 60 aligned with an attenuation filter 70 as well as a detector assembly 80. A conveyor system 90 is also provided and includes a conveyor belt 100 supported by structure 110 to automatically and continuously pass packages or baggage pieces 120 through opening 50 to be scanned. Objects 120 are fed through opening 50 by conveyor belt 100, imaging data is then acquired, and the conveyor belt 100 removes the packages 120 from opening 50 in a controlled and continuous manner. As a result, postal inspectors, baggage handlers, and other security personnel may non-invasively inspect the contents of packages 120 for explosives, knives, guns, contraband, and the like.

Figure 3:
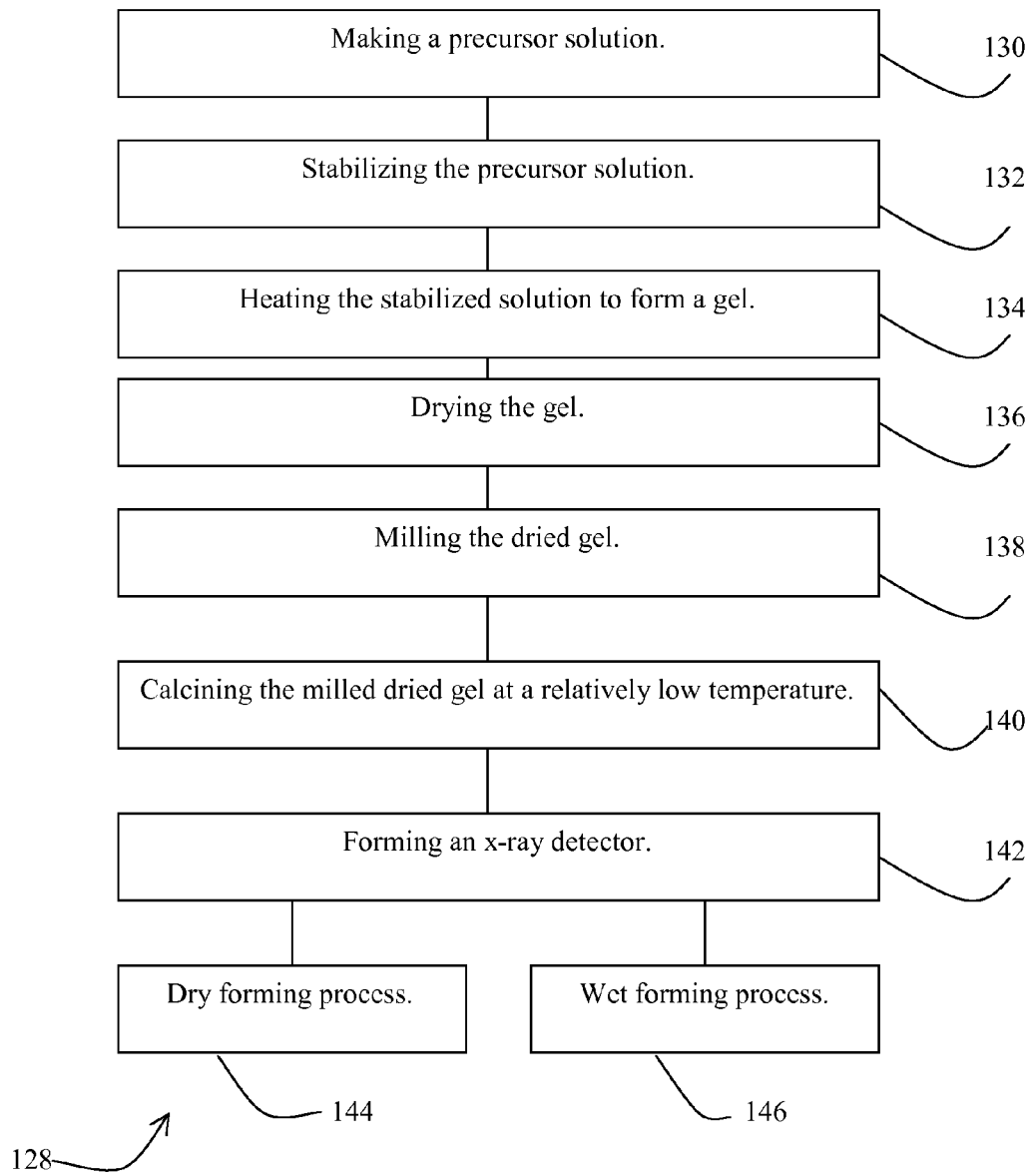
FIG. 3 illustrates a method of fabricating an x-ray detector.

FIG. 3 illustrates a method 128 that can include the step of making a precursor solution 130, the step of stabilizing the precursor solution 132, and heating the stabilized solution to form a gel 134. Method 128 also can include drying the gel at step 136, milling the dried gel at step 138, and calcining the milled dried gel at a relatively low temperature at step 140. Additionally method 128 can include the step 142 of forming an x-ray detector. The forming may be done using a dry forming process 144 or a wet forming process 146 as described in more detail below.

Herein described are methods and apparatus that facilitate the making of a nanometer-structured ceramic scintillator. The herein described methods and apparatus apply to all ceramic scintillator materials with a cubic structure. The scintillator compositions covered in this disclosure include ones based on $Y_2O_3$—$Gd_2O_3$—$Eu_2O_3$, GGG based on $Gd_2O_3$—$Ga_2O_3$:Cr, and Lu—Tb—Al—O:Ce system ceramic scintillators. First, a nanometer ceramic powder with very low agglomeration is produced by a sol-gel (solution/gelatin) method. Then the nanometer powder is sintered into a transparent ceramic at a relatively low temperature. In the sol-gel process, the chemicals have to be carefully selected for making the precursor solution and gel. In the Lu—Tb—Al—O—Ce system, one example of the starting materials is lutetium acetate hydrate (>99.99%) ($Lu(O_2CCH_3)_3 \cdot xH_2O$), terbium acetate hydrate (>99.99%) ($Tb(O_2CCH_3)_3 \cdot xH_2O$), cerium nitrate (>99.99%) ($Ce(NO_3)_3 \cdot 6H_2O$), and aluminum formate hydrate (>99.99) ($Al(O_2CH)_3 \cdot 3H_2O$) with the proper ratio (for example $Lu_{0.8}Tb_{2.17}Ce_{0.03}Al_5O_{12}$) are dissolved in hot DI water (deionized). The certain amount of formic acid, ethylene glycol, and isobutyric acid are added to stabilize the solution. The solution is heated to about 60° C. to 80° C. to remove some water and increase the viscosity by polymerization. Once the solution becomes a transparent gel with proper viscosity, it can be moved into a furnace for drying at about 100° C. to 200° C. The dried powder is then ball milled or jet milled to prevent hard agglomeration. After milling, the powder is calcined at about 600° C. to 900° C. The lower calcining temperature avoids hard agglomeration. This process yields a nanometer-sized ceramic powder that is highly sinterable and highly flow-able. The powder is now ready for further processing.

In the Y—Gd—Eu—O:Pr system, one example of the starting material is yttrium acetate hydrate (>99.99%) ($Y(O_2CCH_3)_3 \cdot xH_2O$), Gadolinium acetate hydrate (>99.99%) ($Gd(O_2CCH_3)_3 \cdot xH_2O$), and europium acetate hydrate (>99.99%) ($Eu(O_2CCH_3)_3 \cdot xH_2O$), and Pr$(NO_3)_3 \cdot xH_2O$ (>99.99%). The alkoxides of a desired ratio are mixed together and dissolved in DI water. Then the praseodymium nitrate can be added into the solution. A certain amount of ethylene glycol and nitric acid can be added to make a transparent solution. The solution is then heated to about 60° C.-80° C. for the polymerization. Once the solution becomes a transparent gel with proper viscosity, it can be moved into a furnace for drying at about 100° C. to 200° C. The dried powder can then be ball milled or jet milled to prevent hard agglomeration. After milling, the powder may be calcined at about 600° C. to 900° C. The lower calcining temperature avoids hard agglomeration. This process yields a nanometer-sized ceramic powder that is highly sinterable and highly flow-able.

For the GGG scintillator, the starting materials is gadolinium acetate hydrate (>99.99%) ($Gd(O_2CCH_3)_3 \cdot xH_2O$), gallium acetate hydrate (>99.99%) ($Ga(O_2CCH_3)_3 \cdot xH_2O$), and chromium acetate hydrate ($Cr(O_2CCH_3)_3 \cdot xH_2O$). The raw materials with the proper ratio to yield $Gd_{3-x}Cr_xGa_5O_{12}$ (x=0.01-0.05) are dissolved in hot DI water. An amount of formic acid, ethylene glycol, and isobutyric acid are added to stabilize the solution. The solution is heated at about 60 to 80° C. to dry the water and increase the viscosity by polymerization. Once the solution becomes a transparent gel with the proper viscosity, it can be moved into a furnace for drying at about 100° C. to 200° C. The dried powder can then be ball milled or jet milled to prevent hard agglomeration. After milling, the powder can be calcined at about 600° C. to 900° C. The lower calcining temperature avoids hard agglomeration. This process yields a nanometer-sized ceramic powder that is highly sinterable and highly flow-able. The powder is now ready for further processing.

Once the nanometer sized powder is obtained, it can be formed into a ceramic green part by either dry compact method or wet cast method.

For the dry compact method, the ceramic blocks can be sintered in a hydrogen or a vacuum furnace. One goal of the sintering is to achieve a relatively high transparency at the lowest temperature possible. In order to achieve that, the grain growth has to be controlled. For a normal ceramic system such as laser ceramic, a sintering aid is added to restrict the grain growth so densification can occur without trapping the pores. Due to the special requirements of the scintillators, the sintering aid can not be used. Without the sintering aid, one needs to ensure that the pores stay at the grain boundaries so that any gas inside the pores can diffuse out quickly. Toward that end, a two stage sintering method was developed to achieve the high densification without any significant grain growth and to achieve a nanometer-structured ceramic scintillator. First, the ceramic is heated to the highest temperature of the process and held at that temperature for very short time, then the ceramic is cooled down to a lower temperature and held for much longer time. For instance, the dry-compacted and further iso-pressed Y—Gd—Eu—O:Pr ceramic is heated to about 1850° C. to 1950° C. and held for about 10 minutes to 1 hour, typically 30 minutes; Then the ceramic can be cooled down to about 1600° C. to 1700° C. and held for about 5 hours to 10 hours. The sintering is done in a hydrogen atmosphere. The higher temperature hold is to provide energy to grow necks between particles and pin the pores between grain boundaries. The low temperature hold is to provide sufficient energy for the pores to diffuse out of the ceramic through grain boundaries while preventing significant grain growth. Typically the grain size can be less than 1 to 2 microns, compared to normal sintering process that leads to over 20 micron grain size. Note, the herein described methods and apparatus provide a nanometer sized powder sintered with a grain size of less than 10μ.

For the Lu—Tb—Al—O:Ce system ceramic scintillator, the dry-compacted ceramic blocks are further iso-pressed to increase green density. The ceramic blocks can then be sintered in a vacuum. First, the ceramic blocks can be heated to about 1650° C. to 1750° C. and held for about 15 minutes to 1 hour, typically 30 minutes. Then the ceramic blocks are cooled down to about 1500° C. to 1600° C. and held for 5 to 10 hours. The mechanisms of control grain growth and achieving full densification are the same as described above. The similar process applies to GGG ceramic scintillator.

The alternative method to the dry compact method is the wet cast method. The nanometer sized-ceramic powder can be mixed with DI water and a small amount of dispersant to form a slurry. Then the slurry can be cast into a mold with required dimensions. The slurry can be allowed to dry in the mold and then taken out for further processing. After drying, the green ceramic blocks can be heated in oxygen to about 600° C. to remove all the dispersant and water and other additives. The sintering process as described above can be performed afterwards.

One important aspect of the herein described methods and apparatus is to achieve nanometer sized ceramic powder with no hard agglomeration and sintering the ceramic without significant grain growth. It provides for full densification and the relatively high transparency of the resulting scintillator while making it possible to sinter at a relatively low temperature and without relatively high pressure methods such as hot pressing and hot iso-static pressing. This provides better performance and lower manufacturing cost.

Figure 4:
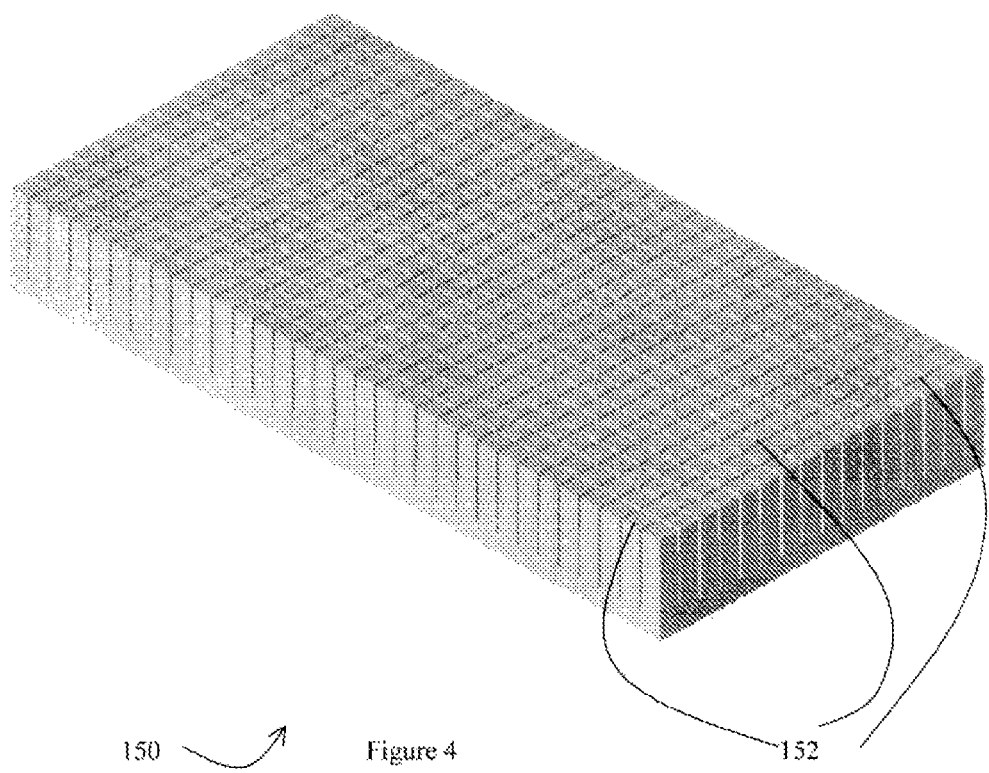
FIG. 4 illustrates a pixelated scintillator pack without a reflector.
Figure 5:
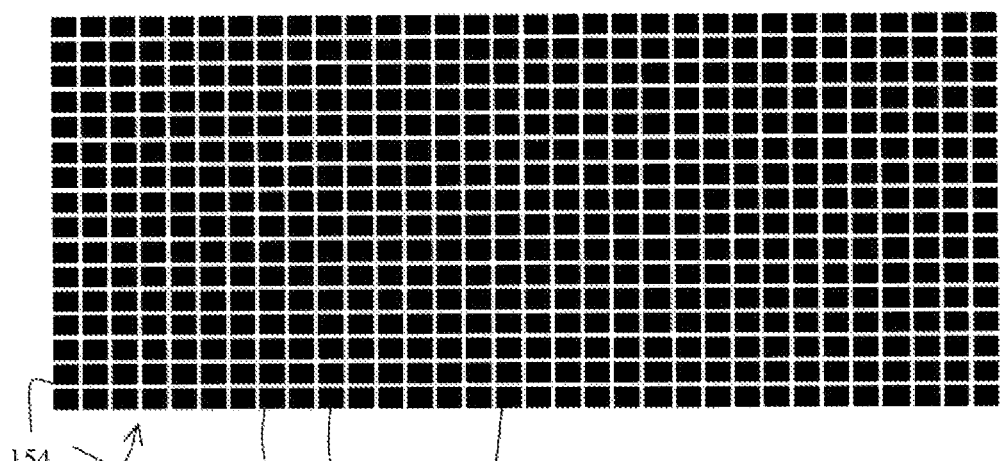
FIG. 5 is a view of the pixelated scintillator pack shown in FIG. 4 looking from the photon exit direction and illustrating reflector material between pixels.
Figure 6:
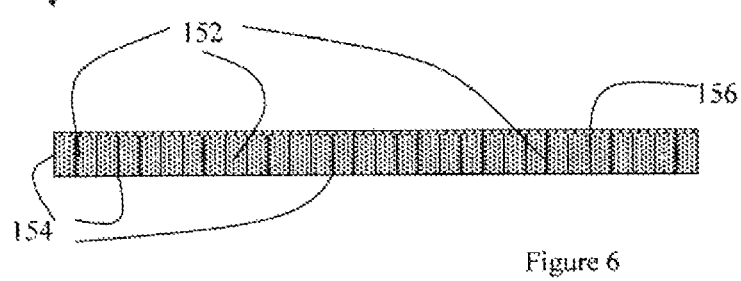
FIG. 6 is a cross-sectional view also illustrating the scintillator pack of FIG. 4 with a reflector positioned between pixels and a top reflector.

FIG. 4 illustrates a pixelated scintillator pack 150 including a plurality of pixels 152. Note there is no reflector yet. FIG. 5 is a view of pixelated scintillator pack 150 looking from the photon exit direction, and illustrates reflector material 154 (which is white in the drawing) between pixels 152. FIG. 6 is a cross-sectional view also illustrating scintillator pack 150 with reflector 154 positioned between pixels 152 and a top reflector 156. Note, energy enters into the top of scintillator pack 150 as viewed looking straight on in FIG. 6 as x-ray energy and this energy is converted to visible photons by the scintillation material within a pixel 152, and these visible photons then impinge a photodiode that would be on the bottom side of pack 150 viewing FIG. 6 straight on.

Figure 7:
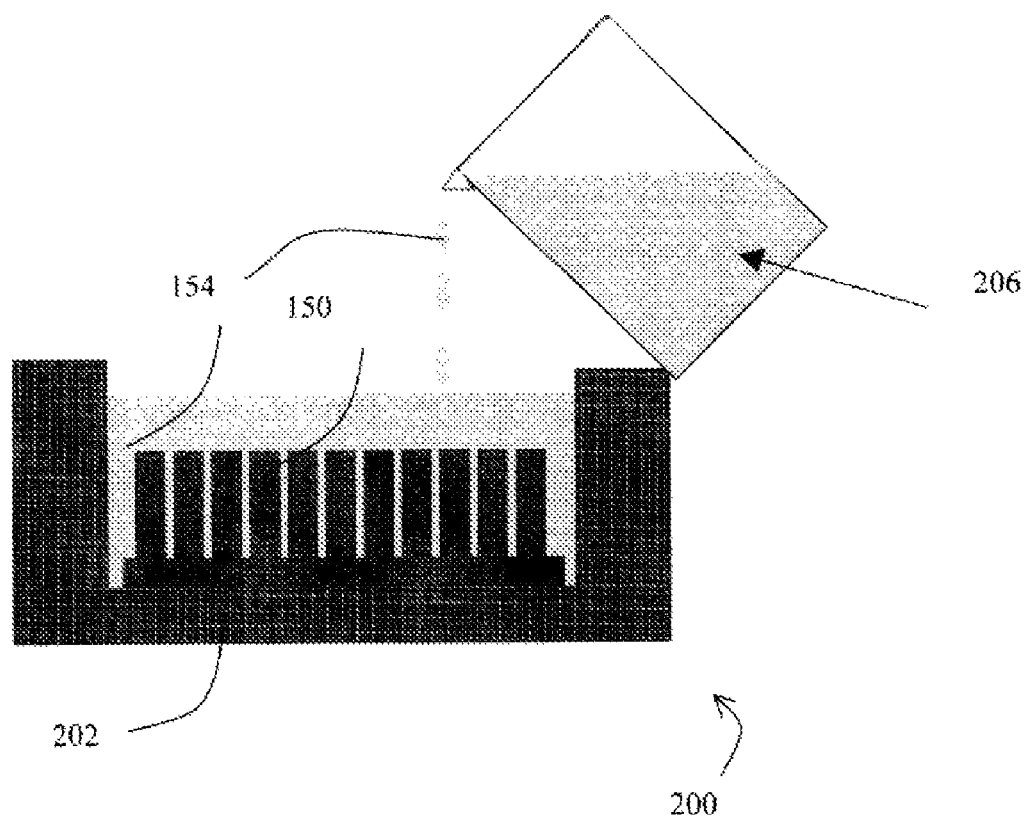
FIG. 7 illustrates a process wherein a mold is provided and within the mold, the pixelated scintillator array of FIGS. 4-6 is placed.

FIG. 7 illustrates a process 200 wherein a mold 202 is provided and within the mold, pixelated scintillator array 150 is placed. Reflector material 154 in a slurry state is then poured into mold 202. As shown in FIG. 7, reflector material 154 may be delivered using a beaker 206. However, any delivery system may be employed including pipes and robots. The reflector 154 is then solidified in the mold 202. Afterwards, the entire assembly is taken out of the mold and machined to the desired geometry (final scintillator pack).

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Technical effects include that the herein described methods and apparatus allow for a nanometer-structure ceramic scintillator with relatively low defects and more uniform properties. The herein described methods and apparatus allow for a low sintering temperature based on nanometer-powder process. The herein described methods and apparatus allow for a relatively high transparency of the ceramic scintillator that leads to high light output and more uniform spectral performance.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A method comprising fabricating an energy detector using a sol-gel process; the sol-gel process comprising:
   making a precursor solution using one or more acetate hydrate compounds;
   forming a gel from the precursor solution;
   drying the gel;
   milling the dried gel to form a nanometer-sized powder;
   calcining the milled gel to form a nanometer-sized ceramic powder from the calcined get
   wherein the powder comprises one of Y—Gd—Eu—O:Pr and GGG (Gd—Ga—O:Cr).

2. A method in accordance with claim 1 further comprising fabricating the detector using nanometer sized ceramic scintillator powder.

3. A method in accordance with claim 1 further comprising calcining at between about 600° C. to about 900° C.

4. A method in accordance with claim 3 further comprising heating to a first temperature for a first time period and then cooling to a temperature less than the first temperature for a second time period longer than the first period, both the first and second temperatures above 1000° C.

5. The method of claim 1 comprising drying the gel and milling the dried gel prior to form the nanometer-sized ceramic powder.

6. The method of claim 1 wherein making the precursor solution comprises forming the precursor solution using compounds that do not include an oxide.

7. A detector comprising substantially only a nanometer sized powder sintered with a grain size of less than 10μ wherein the powder comprises one of Y—Gd—Eu—O:Pr and GGG (Gd—Ga—O:Cr).

8. A detector in accordance with claim 7 wherein the powder calcined at between about 600° C. to about 900° C.

9. A detector in accordance with claim 7 wherein the powder is heated to a first temperature for a first time period and then cooled to a temperature less than the first temperature for a second time period longer than the first period, both the first and second temperatures above 1000° C.

10. The detector of claim 7 fabricated using a sol-gel process.

11. A CT system comprising:
    a x-ray source configured to emit x-rays;
    a x-ray detector positioned to receive x-rays emitted by said source; and
    a computer operationally coupled to said source and detector, said detector comprising primarily a nanometer sized powder sintered with a grain size of less than 10μ;
    wherein the powder comprises one of Y—Gd—Eu—O:Pr and GGG (Gd—Ga—O:Cr).

12. The CT system of 11, wherein the detector is manufactured by the steps of:
    making a precursor solution consisting of compounds that do not include an oxide;
    stabilizing the precursor solution;
    heating the solution to form a gel;
    drying the gel to form a dry powder;
    milling the dry powder;
    calcining the milled dry powder; and
    forming an x-ray detector from calcined and milled dry powder.

13. A method comprising fabricating an energy detector using a sol-gel process; the sol-gel process comprising:
    making a precursor solution using one or more acetate hydrate compounds;
    forming a gel from the precursor solution; and
    forming a nanometer-sized ceramic powder from the gel, wherein the powder comprises one of Y—Gd—Eu—O:Pr and GGG (Gd—Ga—O:Cr).

14. A detector comprising a nanometer sized powder sintered with a grain size of less than 10μ, wherein the powder comprises one of Y—Gd—Eu—O:Pr and GGG (Gd—Ga—O:Cr).

15. A CT system comprising:
    an x-ray source configured to emit x-rays;
    a x-ray detector positioned to receive x-rays emitted by the source; and
    a computer operationally coupled to the source and detector, the detector comprising a nanometer sized powder sintered with a grain size of less than 10μ;
    wherein the powder comprises one of Y—Gd—Eu—O:Pr and GGG (Gd—Ga—O:Cr).

* * * * *

UNITED STATES PATENT AND TRADEMARK OFFICE
CERTIFICATE OF CORRECTION

| | | |
|---|---|---|
| PATENT NO. | : 8,008,624 B2 | Page 1 of 1 |
| APPLICATION NO. | : 11/623723 | |
| DATED | : August 30, 2011 | |
| INVENTOR(S) | : Haochuan Jiang | |

It is certified that error appears in the above-identified patent and that said Letters Patent is hereby corrected as shown below:

Col. 5, line 57 (Claim 1), delete "powder from the calcined get" and substitute therefore -- powder from the calcined gel; --.

Signed and Sealed this

Eighteenth Day of October, 2011

David J. Kappos
*Director of the United States Patent and Trademark Office*